Aug. 23, 1932.  W. E. JOHNSON  1,873,595
STAR FINDER
Filed Jan. 7, 1932  2 Sheets-Sheet 1

Inventor:
William E. Johnson.

Aug. 23, 1932.  W. E. JOHNSON  1,873,595
STAR FINDER
Filed Jan. 7, 1932   2 Sheets-Sheet 2

Inventor:
William E. Johnson.
By Dyrenforth, Lee, Chritton & Wiles
Attys.

Patented Aug. 23, 1932

1,873,595

UNITED STATES PATENT OFFICE

WILLIAM E. JOHNSON, OF CHICAGO, ILLINOIS, ASSIGNOR TO RAND McNALLY & COMPANY, OF CHICAGO, ILLINOIS, A CORPORATION OF ILLINOIS

STAR FINDER

Application filed January 7, 1932. Serial No. 585,377.

This invention relates to improvements in star finders, the term "star" being used broadly to indicate stars, planets, constellations, and other heavenly bodies.

The present invention is embodied in a device of the same general character as shown in Barritt Patent, No. 832,527 of October 2, 1906, but contains improvements over such older device.

Among the features of my invention is an improved structure in a device of the character referred to, contributing to ease and cheapness in manufacture and providing additional uses and advantages in the completed device.

Other features and advantages of my invention will appear more fully as I proceed with my specification.

In those forms of devices embodying the features of my invention shown in the accompanying drawings—

Figure 1:
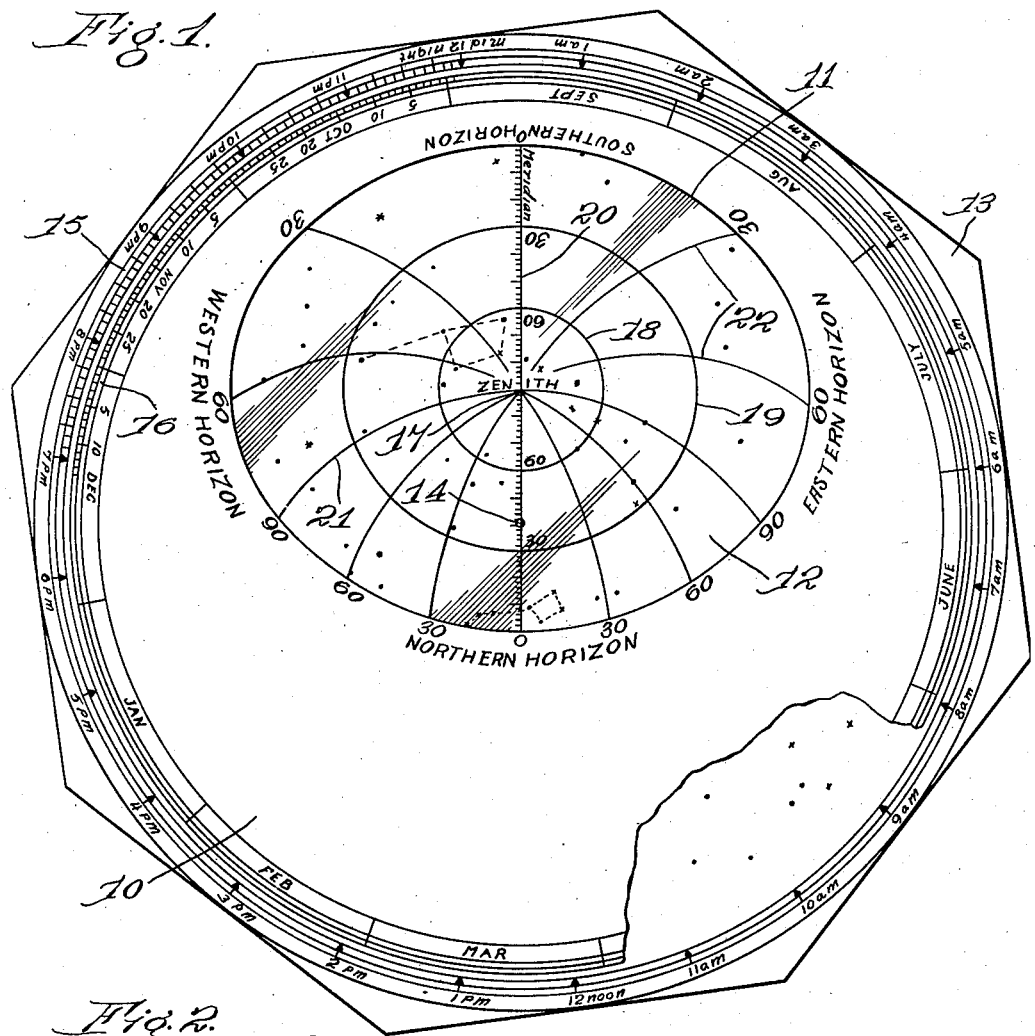
Figure 2:
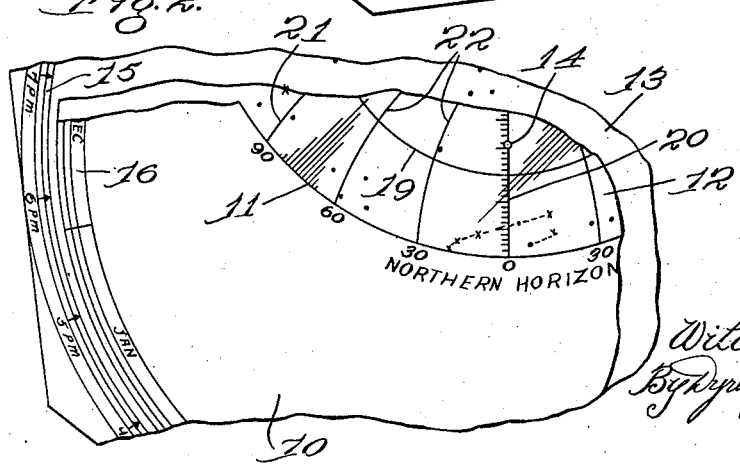
Figure 3:
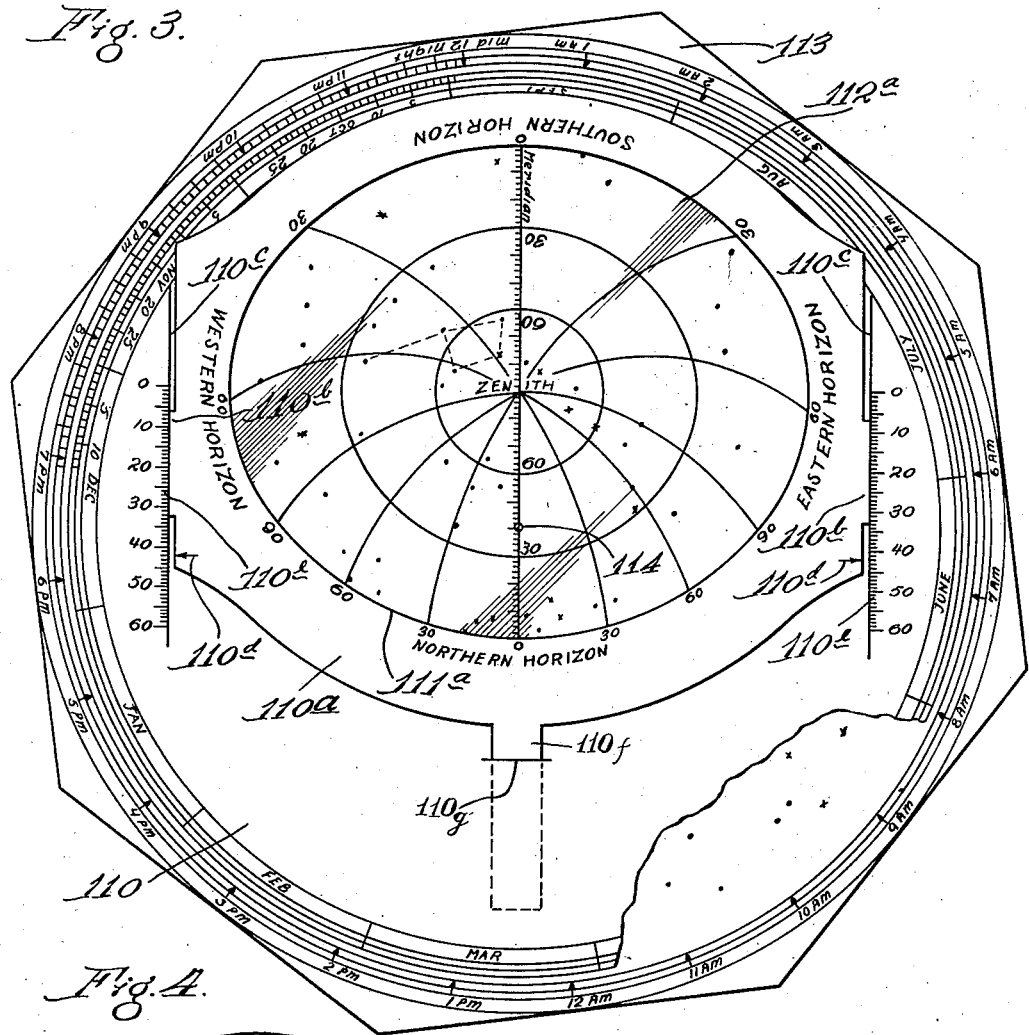
Figure 4:
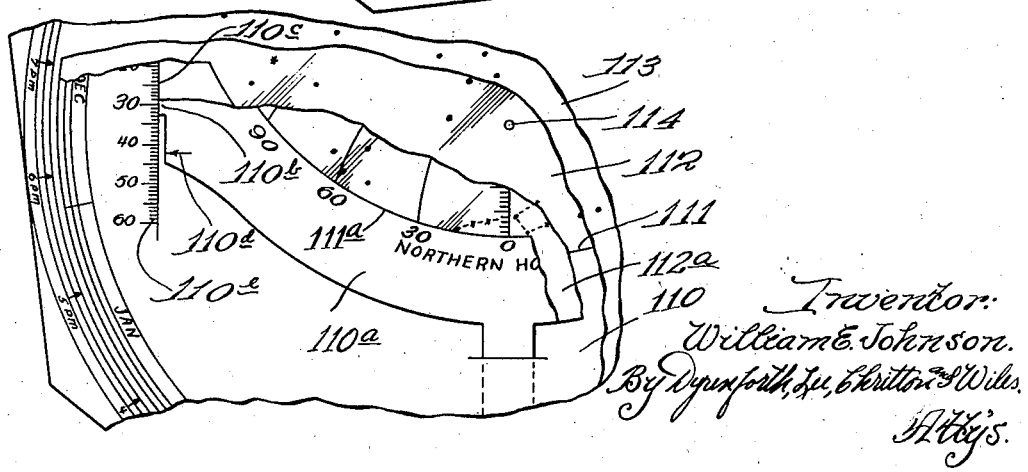

Figure 1 is a top plan view; Fig. 2 is a fragmentary view similar to Fig. 1 showing portions broken away; Fig. 3 is a view similar to Fig. 1 of a modified form; and Fig. 4 is a fragmentary view similar to Fig. 3 showing portions broken away.

As shown in the drawings, the device includes a circular face plate 10 with an elliptical horizon opening 11 therein, which is covered by a sheet of transparent material 12, for example, celluloid.

Numeral 13 indicates a planisphere under the face plate and pivoted to said sheet of transparent material at 14, said pivot point being located substantially at the location of the North Star.

The horizon opening 11 is large enough in proportion to the size of the planisphere substantially to disclose the entire visible star field at any given time and place. The pivot point 14 is located on the transparent sheet 12 between the zenith and Northern Horizon in accordance with the substanial latitude of the place for which the star finder is designed for use. For example, for Chicago, Illinois, such pivot point will be substantially 42° above the Northern Horizon, assuming the center of the opening or zenith to be 90° and the horizon 0°.

The planisphere 13 and face plate 10 are provided with co-acting time and date scales to permit rotation of the former to show the correct star field through the horizon opening at any particular time. For example, the planisphere 13 may be provided with the time scale 15 and the face plate, with the date scale 16.

The transparent sheet of material 12 covering the window or horizon opening 11 in the face plate 10 may bear marks to assist in locating or positioning the stars. For example, it may bear a central mark or point 17 indicating the zenith, concentric altitude circles or parallels of altitude 18 and 19, a meridian line 20, an east and west prime vertical 21 and other vertical circles 22 through the zenith, as desired.

By providing the transparent sheet of material 12 over the opening 11, it is possible to pivot the planisphere on the face plate, which greatly simplifies the construction of the device. In a device of this kind where there is provided merely an opening in the face plate without any sheet of transparent material covering the same, there is no place on the face plate to attach a pivot pin and, consequently, the planisphere or face plate must be mounted one on the other by peripheral guiding mechanism, as shown, for example, in Barritt, No. 832,527 of October 2, 1906, above referred to. The provision of such mechanism for the rotational mounting of the planisphere, however, increases the cost of manufacture of devices of this kind. It is much cheaper to provide merely a pivot pin such as I have shown, provided there is some place on the face plate to which such pin can be attached. The provision of the transparent sheet material 12 over the opening also permits markings thereon that are extremely helpful in the use of the device. For example, as above described, this transparent sheet material may have marked thereon the meridian, zenith, altitude circles and vertical circles. These markings aid the user very much in locating particular stars.

The device shown in Figs. 3 and 4 resembles the one shown in Figs. 1 and 2, with the exception that the face plate carries a member with an auxiliary horizon opening which is adjustable for various latitudes within the range of the device.

In this form, 113 indicates the planisphere, 110 the face plate with the opening 111 therein covered by the transparent sheet 112. Numeral 114 indicates the pivot. In the form here shown, the window 111 is large enough to cover the visible star field through a certain range of latitudes, for example, from latitudes 35° to 45°. Slidably mounted on the face plate 110 is a sheet 110$^a$ provided with an auxiliary horizon opening 111$^a$ which need not be covered at all, but which is here shown as covered with a sheet of transparent material 112$^a$. The opening 111$^a$ need not have any transparent material at all over it because it will be seen that the pivot 114 is attached to the sheet of transparent material 112 covering the opening 111. If desired, however, the opening 111$^a$ may also be covered by a sheet of transparent material 112$^a$ upon which may be placed any desired marks to assist in locating stars. For example, the sheet 112$^a$ may have placed thereon a meridian line, a mark indicating the zenith, altitude circles, vertical circles, and the like. This opening 111$^a$ is slightly smaller than the opening 111 and is made substantially large enough to show the entire visible star field at any given latitude. The member 110$^a$ is provided with ears 110$^b$ inserted in slots 110$^c$ in the face plate 110. The member 110$^a$ also carries a tongue 110$^f$ extending through a slot 110$^g$ in the member 110. This tongue serves to prevent undesirable rotation of the member 110$^a$ with respect to the member 110. The member 110$^a$ may be adjusted with respect to the face plate 110 so that the opening 111$^a$ will show the correct star field at any given latitude. In order to aid in the proper setting of the member 110$^a$, the same may be provided with an arrow 110$^d$ ranging beside a latitude scale 110$^e$ carried by the face plate 110 adjacent the slot 110$^c$.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. A device of the character described, including; a face plate with an horizon opening therein; a sheet of transparent material covering the horizon opening; and a planisphere of the stars under the face plate, pivoted to said sheet of transparent material.

2. A device as claimed in claim 1, in which the sheet of transparent material bears marks to assist in locating stars on the planisphere.

3. A device of the character described, including; a face plate with an opening therein; a sheet of transparent material covering said opening; a planisphere of the stars under the face plate, pivoted to said sheet of transparent material; and an adjustable member mounted on the face plate for various latitudes within the range of the device, said member having an horizon opening lying over the opening in the face plate.

4. A device as claimed in claim 3, in which the horizon opening in the adjustable member is covered with a sheet of transparent material, said sheet bearing marks thereon to assist in locating stars.

5. A device of the character described, including; a face plate with an opening therein; a sheet of transparent material covering said opening; and a planisphere of the stars under the face plate, pivoted to said sheet of transparent material, a portion of the planisphere being visible through said opening in said face plate.

In witness whereof, I have hereunto set my hand this 18th day of December, 1931.

WILLIAM E. JOHNSON.